Patented July 9, 1940

2,207,580

UNITED STATES PATENT OFFICE 2,207,580

AUTOMATIC CONTROL FOR WATER GAS PLANTS OR THE LIKE

Joseph Daniels, Essen, Germany, assignor, by mesne assignments, to Koppers Company, Pittsburgh, Pa., a corporation of Delaware Application March 18, 1938, Serial No. 196,796
In Germany March 19, 1937

4 Claims. (Cl. 303—6)

The present invention relates to automatic controls for shut-off valves or other closing means of water gas plants, blast-furnace hot blast stoves, or other instances in which a series of means is to be moved, for instance valves are to be opened or closed at a predetermined sequence by hydraulic contrivances or devices operated by compressed-air or other means.

My invention now comprehends in particular those controls for the shut-off valves of intermittently operated water gas plants. In the following, I shall explain my present invention with special reference to this working field and give a more detailed description without, however, limiting my invention in all its aspects to use for water gas plants.

It is known to produce water gas in such a manner that a fuel charged into a suitable gas producer is heated to a high temperature by burning a part of the fuel with air, whereupon the air supply is stopped and steam is passed through the glowing fuel. The steam reacts with the carbon at a high temperature with the formation of a gaseous mixture consisting of hydrogen, carbon monoxide and carbon dioxide, said mixture being the so-called water gas. As soon as the fuel is cooled-down by the endothermic water gas reaction, the supply of steam is interrupted and air is introduced again through the fuel in order to heat it up.

For the production of water gas, it is often usual to employ a gas producer consisting essentially of a shaft furnace, which is connected with the various pipe lines for the air required for blowing the fuel bed hot, for the steam, and for the water gas, and with the chimney through which escapes the combustion gases developed during the blow-up period.

Each of these pipe lines is controlled by a shut-off valve or another suitable closing means in such a manner that the respective pipe lines are opened or closed at a given time. Often, it is usual to make use of hydraulic contrivances for the manipulation of the shut-off valves or the like, for example those hydraulic means operated by compressed-oil. Manipulating devices operated by compressed-air are also sometimes adopted for the operation of the valves.

As already mentioned before, the shut-off valves of a water gas plant have to be operated in a given sequence. It is therefore most important that each individual valve finishes completely its movement, i. e., either the opening or closing function before the following valve is actuated. Otherwise it may happen that dangerous operating difficulties occur. If for instance the air-valve is still somewhat opened so that air can enter the gas producer, while water gas is generated in it by the introduction of steam, a certain quantity of air may enter the water gas so that highly explosive mixtures of air and gas will result. On the other hand, it is possible that the valuable water gas will escape through the chimney damper if same is not fully closed.

Quite a number of suggestions have already been made for the development of contrivances which enable a fool-proof and proper reversal of the shut-off means of water gas plants. I have, however, found that none of the known reversal or controlling apparatus answers fully the above requirements, i. e., to prevent a movement of the shut-off valves as soon as one of them has not reached its exact final position and to avoid simultaneously other disadvantages with regard to the operation of the plant.

The main object of my present invention now consists in the provision of a control for water gas plants or the like which is able to fulfil the following requirements:

1. The controlling equipment enables a definite but variable sequence for the manipulation of the various shut-off valves.

2. In case of difficulties, especially when any of the valves has not reached fully its end position, the further reversal of the valves is interrupted automatically at once.

3. The time between the actuation of the individual shut-off valves may be highly varied.

4. No alteration in the sequence or in the operating periods reduces the safety of the plant against faulty operations, i. e., the action of the shut-off means which prevent the further movement of the controlling apparatus in case of mistakes, is fully prevented.

5. Finally, it is possible to make alterations to the position of the individual shut-off means by hand any time, without changing the operation of the automatic controlling apparatus.

The former automatic controlling apparatus for water gas plants generally consisted of a control similar to a reversing clock which at a given time and at a given sequence manipulated the valves, perhaps over suitable relays, through which the pressure medium passed to the various valve cylinders to be operated. With these controlling apparatus known hitherto, difficulties arose by the sticking or incomplete closing of valves or the like without stopping the controlling apparatus. The operator supervising the apparatus was charged in case of danger to press pushbuttons or the like by means of which the clock could be set out of operation and the movement of the shut-off valves was stopped.

The supervising operator of the plant is, however, not in a position to draw his full attention to the reversals which follow quickly one after the other, when manipulating the multitude of shut-off valves of a water gas plant.

I have already described in my application for Letters Patent dealing with Improvements in operating devices for water gas plants, blast furnace stoves or the like, executed on the 26th of January, 1938, Serial No. 189,241, filed February 7, 1938, a new and improved automatic control for several shut-off valves, preferably of blast furnace hot blast stoves, the system Cowper, or the like.

The control described by me formerly works fully automatically. Thereby I use stop or blocking valves which are operated by the shut-off valves after reaching a given end position. If one of these shut-off valves does not come into its proper end position, the movement of the remaining valves is prevented at once. The automatic control as described in my former patent application is especially suitable for Cowper stoves or similar plants in which the valves do not have to be reversed so often and in which, except one valve governing the delivery of purging steam, all other valves are opened or closed only once during one run.

In certain water gas plants, it is however necessary to open and close, within one run, several valves, twice or more as the case may be. Further an adjustable pause has to be made between the opening and closing of the valves as required by the water gas production.

In order to meet also this requirement and to fulfill all other conditions already pointed out which are necessary for a proper sequential control apparatus for the water gas plants or the like, but to make use of fairly simple reversing processes and means, I now have developed a new and improved automatic control apparatus and described it fully in the following.

With the above and other objects of my present invention in view, I will now describe in detail my new invention on the lines of the accompanying drawings which show in principle a preferred embodiment of my invention.

Figure 1 of the drawings illustrates a scheme for the operation of a water gas plant and from this scheme it may be seen clearly which movements are to be performed by the various shut-off valves of the water gas plant during a full operating period or run.

The water gas production plant for which the execution of the present invention is fully exemplified below, is equipped with 8 shut-off valves in total, that is to say:

1. The shut-off valve 1' necessary for the air to be blown underneath the grate of the gas producer, said air being hereinafter called primary air;

2. The shut-off valve 2' for secondary air which is introduced into the upper part of the gas producer for the purpose of burning there the combustibles of the hot blow gases or in the combustion channel connected with the gas producer so that for instance the heat thus produced by secondary combustion of the blow gases may be utilized in a regenerator connected with the gas producer;

3. The shut-off valve 3' for purging with steam which is led, after the blow hot period, for a short period from above through the gas producer and the regenerator in order to prevent a mixing of the blow gases with the valuable water gas;

4. The shut-off valve 4' controlling the chimney through which the blow gases and other exhaust gases escape;

5. The shut-off valve 5' controlling the outlet of water gas above the charge of the gas producer;

6. The shut-off valve 6' governing the steam line which delivers the steam underneath the grate of the gas producer;

7. The shut-off valve 7' governing the water gas line coming from the space underneath the grate of the gas producer and 8. The shut-off valve 8' governing the supply of steam to the regenerator connected with the gas producer.

The scheme according to Figure 1 represents the position of the various shut-off valves during a complete working period or cycle. The arrow $a$ of Figure 1 indicates the direction in which the chart is to be read in point of time. The following movements of the valves take place during a whole working period or cycle, reading from right to left of Figure 1:

First of all, the generator is blown hot, whereupon the gas producer is then purged with steam. Thereupon for a certain period, steam is delivered from below through the charge of the gas producer (up-run) and after this, steam is admitted from above through the charge of the gas producer (down-run). Afterwards, steam is again led for a short time from below through the charge of the gas producer and the operating period or cycle is now finished. The charge of the gas producer is then again blown hot, commencing the next cycle.

The character of the various shut-off valves 1 to 8 has been indicated in the column at the right hand side of Figure 1 and their relative open and closed position shown by having the shaded areas indicate when the respective valves are closed and the non-shaded areas show when the respective valves are open.

The apparatus according to the present invention, full details of which will be given in the following, permits such movement of the shut-off valves that the operating process of the water gas plant, as illustrated in the scheme of Figure 1, may be carried through exactly as required without it being necessary for the operator of the plant to perform any manipulation by hand.

Now the automatic control for water gas plants, built according to the present invention will be described by me in full particulars with reference to Figures 2 to 5 of the drawings.

Figures 2 to 5 of the drawings show only in principle the apparatus constructed according to the present invention. But those skilled in the art will appreciate that for the practical execution of the apparatus, other well-known and approved constructional means also may be used, instead of the parts for the plant as illustrated schematically on the drawings.

The apparatus shown on the drawings is operated by compressed-oil (oil under pressure); by means of a pump (not shown on the drawings for reasons of simplicity) the pressure of said oil is increased to the pressure necessary for the manipulation of the individual shut-off valves. Each shut-off valve is provided with a hydraulic arrangement in order to be able to open and close the valve independently of the other ones which practice is already usual in other automatic controls for water gas plants.

Instead of operating the shut-off valves by means of compressed-oil, other liquids or gases under increased pressure also may be used. In such a case, the apparatus shown in principle on the accompanying drawings, has to be adapted accordingly in a manner which is known to those skilled in the art.

When using a liquid for the transfer of pressure, it is advisable to return the decompressed medium leaving the working cylinders of the shut-off valves through a collecting line back again to the pump.

The reversal of the shut-off valves is effected by means of a control shaft 13, rotating in stationary bearings 13a. On the shaft 13 are mounted cam discs which at a given sequence actuate one after the other, the valves which permit the flow of the compressed medium to the working cylinders of the valves and the withdrawal of this medium from the cylinders.

The compressed medium for those operating valves which only perform one operating movement, one after the other (opening or closing), is released or stopped by means of actuating valves which are actuated by the operating valves when they reach their final operative position.

I have already described such an arrangement in full detail in my copending patent application for "Improvements in operating devices for water gas plants, blast furnace stoves or the like," executed on the 26th of January, 1938, Serial No. 189,241, filed February 7, 1938.

Contrary to all similar automatic controls known hitherto for water gas plants, the control according to the present invention is characterised in that the control cams do not rotate continuously but they stand still at definite periods of the operation. The cam shaft is, however, constantly under the influence of its driving arrangement, i. e., also during the standstill, so that the cam shaft begins to turn immediately upon the withdrawal of the stop out of action. The stoppage of the cam shaft is carried out by means of stops which are actuated only through the operating valves when they have reached their proper final position, i. e., when the movement of a valve or valve-group is fully completed. Only then, the necessary stops of the control cams are withdrawn and the hydraulic driving arrangement being under a constant pressure is able to move the cam shaft somewhat up to the next stop. The peculiarity of this driving method for the main impulse of operation of a water gas plant will be described later.

First of all, a full explanation will be given dealing with the reversal during a complete working period or cycle.

The reversing apparatus and shut-off valves of the water gas plant have been illustrated on the drawings in a manner such as when all the reversing valves are closed and the chimney valve 4' has just been supplied with pressure-oil. The cam disc 1 controlling the chimney valve 4' has opened the valves 3 and 4 and closed the valves 5 and 6 by means of the lever 2. The valves 3, 4, 5 and 6 are placed on a common rod. From the main compressed-oil delivery line 7, the oil flows through the line 8 and 9 into the lower cylinder chamber of the chimney valve 4'. The oil from the upper cylinder chamber is pressed through the line 10, valve 4, line 11 into the line 12 for released oil.

The control shaft 13 is actuated by a ratchet wheel 14 and a hydraulic piston drive 15 which in its final position is reversed automatically by means of the valves 16 and 17. The reversal is effected in such a manner that at the end of the leftwise driving stroke of piston 15, a rod 19 is pushed to the left through the stop 18 on the piston rod 15a so that the lever 20 fitted with a weight 20a drops into the opposite position to that shown in Fig. 2, thus closing the compressed-oil inlet valve 16 and opening the oil outlet valve 17. The piston now moves to the right, the ratchet idling over the teeth on disc 14, and the oil from the cylinder chamber 21 of the piston 15 is now withdrawn through the line 22, valve 17 and line 11 into the waste-oil line 12. The piston 15 is constructed as a differential piston and supplied as well as driven from the left-hand side on the drawing with compressed oil which flows from the main line 7 through the line 23. At the end of the stroke to the right lever 20 is pulled off of valves 16 and 17 to the position shown in Fig. 2, opening valve 16 and closing valve 17. Oil now flows through 16 to 22 moving the piston 15 to the left. The oil to the left flows out through 22' into oil flowing to valve 16, being thus displaced from the left hand side to the right hand side of piston 15, thereby driving the latter to more slowly drive 14. A speed-regulating valve 24 permits the adjustment of the piston speed. The engagement on the ratchet wheel 14 from the rod of the piston 15 is ensured by setting into operation an angle-lever 25 after each movement of the piston 15.

Figure 2:
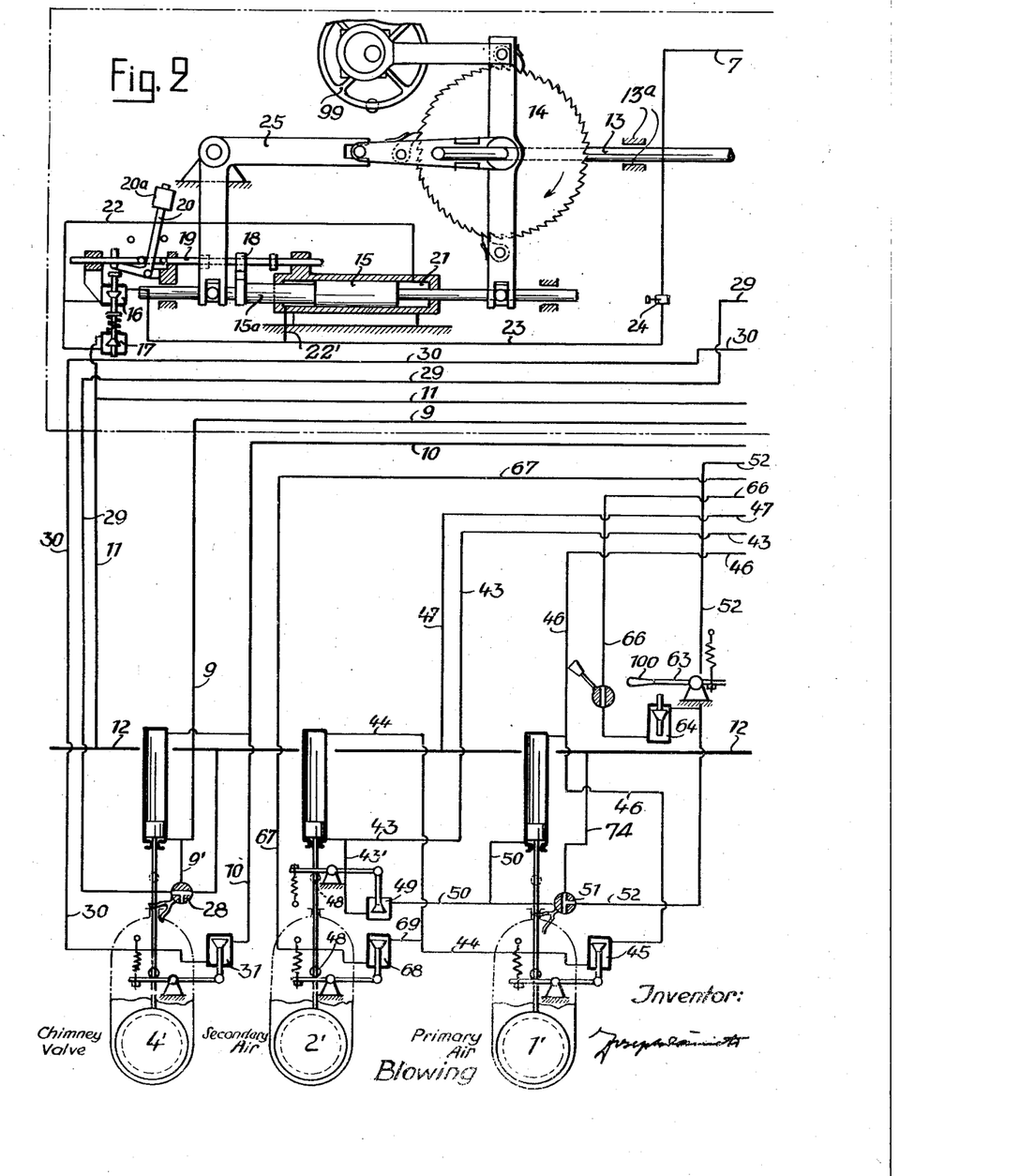
Figures 2 to 5 show more schematically the construction of a reversing device for a water gas production plant, the shut-off valves of which may perform the movements illustrated in Figure 1.
Figure 3:
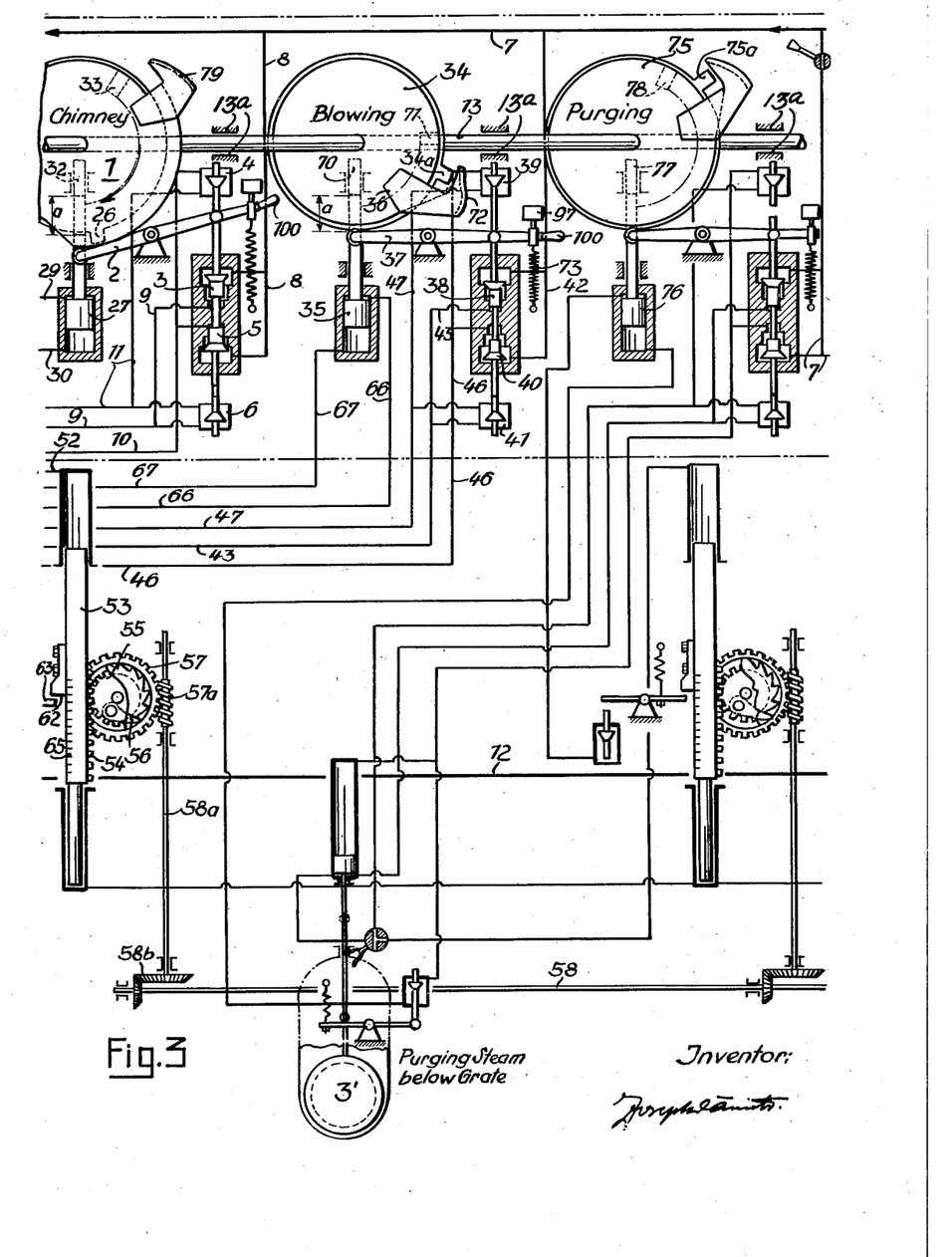
Figure 4:
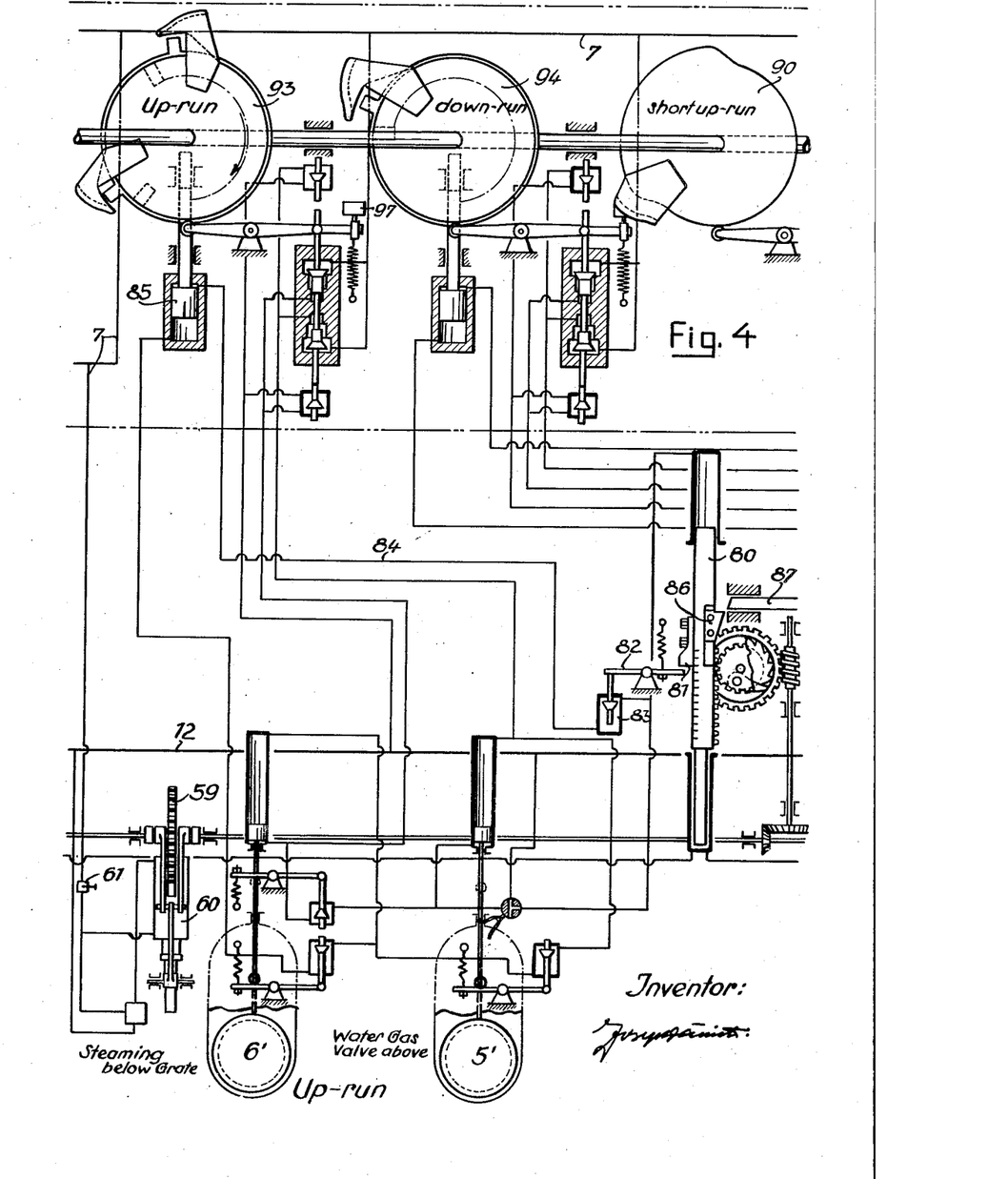
Figure 5:
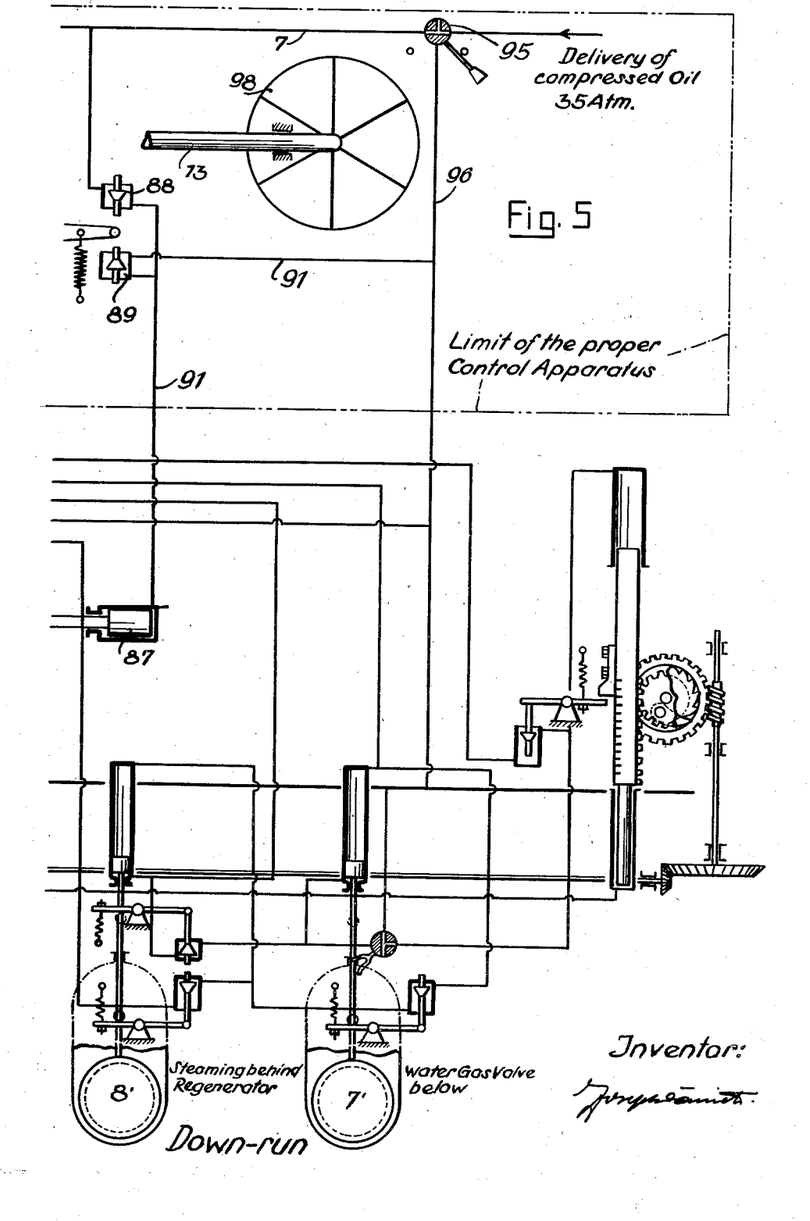
Figure 6:
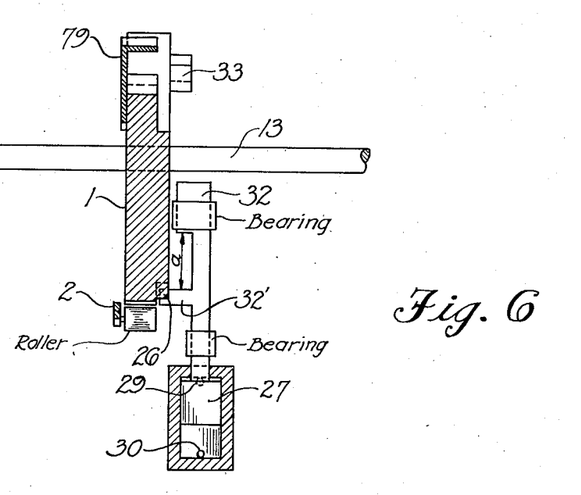
Fig. 6 is a diagrammatic view of the cam discs like cam disc 1.
Figure 7:
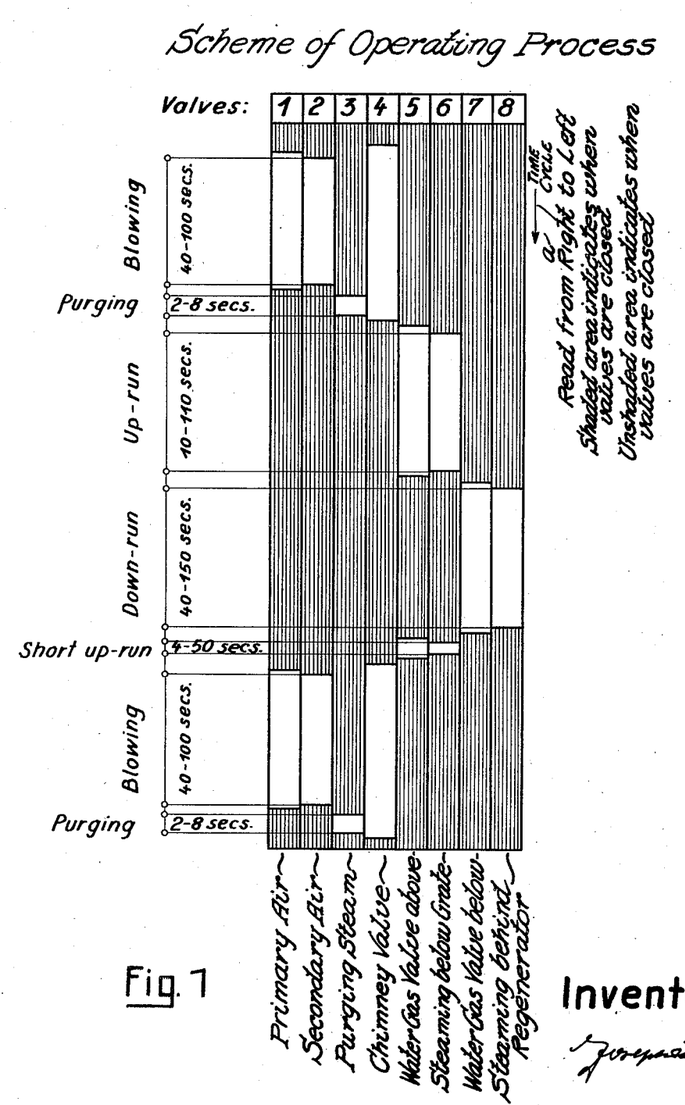
Fig. 7 is a diagrammatic view of a non-return valve.

When the cam disc 1 has pushed downwards the lever 2 by means of the cams and has adjusted the valves for the chimney-damper 4' accordingly, then the cam 26 of the disc 1 abuts against a lower stop 32' on the rod of a stop-piston 27 which is not connected with lever 2 but is in the lifted position. Although the piston 15 is still pressing upon the ratchet wheel 14 and thus upon the control shaft 13, the control shaft now stands idle because of 26 abutting its stop as shown in Fig. 7. When the piston of the chimney damper 4' has reached its top position, it reverses a three-way cock 28 in such a manner that the compressed oil from the lower cylinder chamber of the damper 4' flows through the line 9' and line 29 into the upper cylinder chamber of the stop piston 27. The stop piston 27 is thus pushed downwards and the waste-oil from the lower cylinder chamber of the stop piston 27 now flows through the line 30, valve 31, line 10 and through the opened waste-oil valve 4 into the waste-oil line 11 and 12. The showing of the valve 31 for the lower stop of the piston 4' represents a piston valve such as shown in Fig. 6. The oil pressure of the line 30 influences the lower piston surface of this valve and the valve 31 is lifted against the tension of spring 31a to a small extent. When lifting the valve, suitable ports 31' provided for the piston shaft, as shown in Fig. 6 of the drawings, are thereby uncovered through which the oil may flow underneath the cone seat, thus reaching the pipe 10. The function of the valve 31 at this period, therefore is similar to that of a non-return valve.

Now, the stop piston 27 has moved downwards and with it the stop for cam 26. Thereby the cam 26 on the cam disc for the chimney valve has been made free, but a second stop 32 provided on the piston rod of valve 27 is also drawn downwards and brought within the range of a cam 33 fitted to the cam disc 1. This cam 33 comes, however, into action only later-on. The control shaft 13 is meanwhile still turned onwards by means of the driving arrangement, since the cam disc 1 is free. The valves for the chimney damper 4' remain in the just described open position, as it is necessary that the chimney damper be kept open for the blow-run.

On rotating the cam shaft 13, at the conclusion of the blow, the cam 34a of the "blow" cam disc 34 abuts against the lower stop of the rod of the stop piston 35, thus interrupting again the rotation of the cam shaft 13. When the cam 34a fits against the rod of the stop piston 35, the valves 38 and 39 are opened and the valves 40 and 41 are closed by means of the cam face 36 and the lever 37. The compressed-oil now flows from the main line 7 through the line 42, valve 38, line 43 into the lower cylindrical chamber of the secondary air valve 2'. The oil to be discharged from the upper cylindrical chamber of this secondary air valve 2' is pressed through the line 44, through the piston valve 45 again acting as a non-return valve, through the line 46, valve 39, line 47 into the waste-oil line 12. If the secondary air valve 2' has reached its upper position, it opens a valve 49 by the aid of a stop and lever 48. Compressed-oil from the line 43 flows then through the line 43' into the pipe 50 and to the lower cylinder chamber of the main- or primary-air-valve 1'. In its upper position, the primary air valve 1' opens the three-way cock 51. The compressed oil now flows from the pipe 50 through the line 52 into the upper cylinder chamber of the differential piston 53.

Chimney damper, secondary air and primary air valves are now opened, i. e., the "blow" run has started. It is necessary for the blow-run to measure accurately the duration and to let it finish-off automatically. This function is performed by the differential piston 53.

For this purpose, the rod of the differential piston is equipped with a rack 54. A toothed pinion 55 engages such rack. The pinion is equipped with a pawl 56 under spring-pressure. The spring-loaded pawl 56 engages, on its part, an inner set of teeth on the worm-wheel 57 and as soon as the upper cylinder chamber of the differential piston 53 has been supplied with compressed-oil, the pawl tries to rotate the worm-wheel. The worm-wheel 57 is, however, prevented from a quick movement due to the constant rotation of the worm 57a at a comparatively low and adjustable number of revolutions. A rotation of the worm-wheel 57 and thus a downwards moving of the piston 53 only at an adjustable speed is thereby rendered possible.

The drive of the worm 57a together with other stop-worms is done commonly by a shaft 58 which is connected with the axis of the worm 57a by means of the shaft 58a and the conical wheel gearing 58b. The shaft 58 is fitted with a ratchet wheel 59 which on its part is operated by a hydraulic drive 60 which is designed and operated similarly to the hydraulic drive of the cam shaft 13. The number of revolutions for the shaft is in this case, likewise adjusted by a regulating valve 61 in the compressed-oil line delivering the medium to the hydraulic drive 60.

The duration of the blow-run depends on the downward velocity of the differential piston 53. The end of the blow-period comes when the stop 62 on the rod of the differential piston 53 touches a spring controlled lever 63 which opens a valve 64. The period may also be altered by adjusting the stop 62. The measure of time may be seen from a dial 65 mounted on the rod of the differential piston 53. During the downward movement of the differential piston 53, the oil from the lower smaller cylinder chamber which is constantly charged with compressed-oil from the main line 7, is forced backwards again in this line by the downward movement of piston 53.

At the end of the blow-period, which was determined by the stop of the lever 63, the compressed oil from the line 52 flows through the valve 64 and through the line 66 into the upper cylinder chamber of the stop piston 35. The oil from the lower cylinder chamber of the stop piston 35 may escape through the line 67, the piston valve 68 acting as a non-return valve, furthermore through the lines 69, 44, piston valve 45, line 46, outlet valve 39 and the waste oil lines 47 and 12.

After the downward movement of the stop piston 35, the lower stop of the piston 35 has released the cam 34a so that the control shaft 13 is turned onwards by its driving arrangement. Similarly, to the chimney disc cam, a second stop 70 on the piston rod has also engaged at the disc 34 the range of a cam 71, due to the downwards movement of the stop-piston 35 by which the movement of the control shaft is again stopped. The distance a between the upper line of the lower and the bottom line of the upper piston rod stop of the piston 35 is of such dimension that for instance the cam 34a is not free, does not pass over the top of its stop until the upper piston rod stop 70 has already descended and reached the range or path of movement of the second control disc stop 71. In this way, any undesired onward movement of the control shaft is avoided until the piston rod has descended enough for stop 70 to clear stop 71, and thus a faulty operation of the shut-off valves is safely prevented.

When the cam 71 on the "blow" control disc 34 fits against the piston rod stop 70, then the valve lever 37 is brought back again into the indicated position. In order to avoid a sticking, the face 36 is further provided with a return-sliding face 72 so as to bring the roller of the lever 37 back into the original position, should it happen that the lever springs 73 are weakening.

Now, the valves 38 and 39 are again closed and the valves 40 and 41 are opened. The compressed oil leaving the main line 7 and flowing through the line 42 now flows through the valve 40, line 46 into the upper cylinder chamber of the primary air-valve 1'. The valve is moved downwards and its piston rod, at the beginning of the downward-movement, reverses the three-way cock 51 again into the position as shown on the drawings. Thereby, the space above the large differential piston 53 is vented through discharge line 12. Due to the constant supply of oil to the lower differential piston, the oil is discharged from the upper cylinder chamber of the piston 53 through the line 52, the three-way cock 51, the line 74 into the waste-oil line 12. The differential piston moves upwards at an increased speed, since the worm and the worm-wheel 57 do not have any unfavourable effect on the upwards movement.

When the piston of the primary air valve 1' has moved downwards, it opens in its lower position the valve 45. The compressed-oil from the line 46 can now enter through the valve 45 and the line 44 into the upper cylinder chamber of the secondary air valve 2'. The waste-oil from the lower cylinder chamber of the valve 1' as well as the waste oil from the lower cylinder chamber of the valve 2' can now flow through the line 50, the opened valve 49, line 43', line 43, the opened outlet valve 41 into the waste-oil line 47 and 12. If the piston of the valve 2' has finished its path, the valve 68 is opened in the lower position of the valve 2'. The compressed-oil can then flow from the line 44 and 69 into the line 67 and here it is introduced into the lower space of the stop-piston 35. The stop piston 35 is again lifted and the oil from the upper cylinder chamber of the stop piston 35 penetrates through the line 66, through the valve 64 acting as a non-return valve, through the line 52, three-way cock 51 and line 74 into the waste-oil line 12.

The stop piston 35 has again reached its initial position, as shown on the drawings, i. e., the stop 70 has been brought outside the range of the cam 71. The cam shaft 13 can now be turned onwards until the cam 75a on the other disc 75 provided for the purging-run, rests against the piston rod stop of the piston 76. The stop piston 35 of the "blow" controlling-disc remains in this drawn position until the next run is commenced with and the cam 34a comes into operation, whereby the valves necessary for the blow-run are opened.

The same cycle is now similarly repeated at all further control discs, for the purging process, for the down-run, and for the up-run. The contrivances are similar to those just described for the blow-run.

It must also be mentioned that at the end of the purging-run, i. e., when the upper stop 77 of the stop piston 76 for the "purging" control disc is again out of engagement with the stop 78. The time for holding open the valves for the chimney-valve is completed. The action of the elevated cam face of the chimney controlling disc 1 terminates here and by means of its return-sliding rail 79 it leads the valve lever 2 back again into the horizontal position.

As already pointed out, the stop piston 27 for the chimney cam disc has been pressed downwards by means of the three-way cock 28 at the chimney damper 4', i. e., the piston rod cam 32 has been brought within the range of the control disc cam 33.

After completion of the blowing and purging period and after the horizontal position of the lever 2 by the aid of the return-sliding rail 79 has been arrived at, the cam 33 arrives against the piston rod stop 32, thus preventing the further movement of the cam shaft 13; thereupon the closing period for the chimney damper begins. The compressed oil from the main line 7 and the delivery line 8 now flows through the opened valve 5 and through the line 10 into the upper cylinder chamber of the chimney valve 4' and the waste-oil from the lower cylinder chamber goes through the line 9, the opened valve 6 into the line 11 and into the main waste-oil line 12. If the chimney damper 4' has reached its lower position, it opens the valve 31 and the compressed oil from the line 10 enters the line 30, lifting again the stop piston 27 into the withdrawn position in order to offer the stop 26 the necessary resistance for the next run and to prevent at a given time the further movement of the controlling disc 13. The oil to be discarded from the upper cylinder chamber of the stop piston 27 flows through the line 29, the opened three-way cock 28 into the waste-oil line 12.

As may be seen from the operating scheme shown in Figure 1 of the drawings, after the chimney valve 4 is closed the upper water gas valve 5 and uprun steam valve 6 are opened and closed, then the downrun water gas outlet valve 7 and downrun steam valve 8 are opened and closed. Following this the up-run is on again for a short period after the down-run. This portion of the cycle is carried out with the same contrivance which is used for the up-run. In order to make use of the same time-measuring apparatus, an additional contrivance has also been provided by means of which the time measuring differential piston 80 is prevented from returning into its original top position so that when the time measurement is introduced for the short up-run, the adjustable stop 81 on the piston rod of the differential measuring piston 80 may again operate the valve lever 82 and thus the valve 83 within the cycle again after a short period in order to again lead the compressed-oil through the line 84 into the upper cylinder chamber of the stop piston 85 and thereby to introduce the final closing process for the valves 5' and 6' in the same way as described before for the valves 1' and 2'.

For the purpose of obtaining a shorter return for the differential time measuring piston 80, an adjustable stop 86 has been mounted upon the piston rod of the differential piston 80 which on the return of the piston 80 towards its upper position fits against the stop 87 provided with a piston. The piston of the stop 87 is controlled by the valves 88 and 89, the latter being governed by a special cam disc 90. The curve-face of the cam disc 90 extends over its circumference and in particular within the angle of rotation, which is arranged in such a manner that after the completion of the time measurement for the main gas process oil under pressure is added from below through the valves 5' and 6' into the rear cylinder chamber of the piston 87 through the line 91.

In this way, when the time has been measured for the main steaming process and the differential piston 80 is to go back into its initial top position, it is only necessary to touch a part of this return-way until the stop 86 actuates the piston rod 87.

After completion of the short up-run, the compressed oil from the line 91 and thus from the rear cylinder chamber of the piston 87 is removed again by a suitable guide of the curve face of the controlling cam 90. The front of the differential piston 87 is exposed to the influence of compressed-oil which may flow over constantly from the line 92 which on its part is connected with the main supply line 7. The cam disc 93 provided for the up-run, has therefore to control the working process for which two cam groups are arranged on the circumference of the controlling disc 93. One of these groups operates when the main up-run takes place and the other one is set into action when the down-run is completed by means of the controlling disc 94 and the "short up-run" may begin. The operating method of the stop pistons and of the control-valves is similar to that of the controlling cam discs 93 and 94, as already described in connection with the controlling cam disc 1 and the controlling cam discs for the "blowing and purging" cycle.

In order to be able to manipulate the individual valves by hand which are equipped with counter-weights and hand winches, a three-way cock 95 has been built into the main compressed-oil line 7. In closed position, the line 7 can be connected with the waste-oil line 12 through the line 96. Thus, all valves are released from pressure-oil.

A special advantage of the before described reversing arrangement consists in that the valves remain fed with compressed oil even in closed position, i. e. they are kept in their closing position.

The controlling apparatus is suitably mounted in a cabinet, whereby the valve levers 2, 37, etc. are provided with plates showing the inscription of the respective operating process, i. e., "blow," "purging," "steaming," etc. It is advisable to make the plates visible through the windows of the apparatus casing. Furthermore, it is possible to fix a sector-plate 98 to the head of the controlling shaft. Also the plate 98 is placed behind a glass pane to observe the condition of the reversing apparatus.

Moreover, the controlling cam device may also be operated by a hand-drive 99 in case of a failure of the hydraulic drive. Suitably, two hydraulic drives each are provided for the drive of the controlling shaft 13 and also for the drive of the controlling time shaft 58 so that always one drive is in reserve, in case the packings etc. of the other drive have to be exchanged or repaired.

Handles 100 at the valve levers 2, 37, etc., as well as 63, etc., which extend in a suitable manner through the reversing casing, permit the manual operation in order to be able to manipulate the various valve groups independently from one another. For this reason, also the stop pistons 27, 35 and 76 are equipped with handles. It is, of course, understood that some further blocking valves and rods will become necessary which are not shown on the drawings so that in case of a manual operation, the hydraulic drive of the controlling shaft 13 as well as the various compressed-oil supplies 8, etc. connected with the main line 7, may be stopped. The handles for the manipulation of the valve levers and the controlling cams must, however, be kept covered during the hydraulic drive and the touching of them by people not on business is prohibited and must be rendered impossible for example by suitably designed hoods, bridging over the handles of the levers and being stopped in such a manner that they can only be opened if the main drive is disconnected and all other arrangements have been made in order to prevent any faulty operation.

The reversing operation must finally also allow to be interrupted during the charging period. This may suitably be also done by the main shut-off cock 95 in that it is connected preferably with the starting device of the charging operation.

Summarising, I should like to make the following remarks:

With the apparatus illustrated on the drawings, the reversal of the valve groups is effected by controlling cams and the reversal of the valves within the various groups is done by suitably arranged end-position-valves which are operated by the slide-valves at a simultaneous introduction of the start of the time-measurement. The movement of the controlling shaft is dependent on the position of the valve operation. During the normal operation, the controlling shaft is constantly influenced by its driving device, but it is hindered in its movement by means of stop-cams. The stop cams are only released if certain conditions have been fulfilled in connection with the next operation. The conditions for the following operation are then answered if the measuring time for one working process has elapsed and furthermore if the last valve of an operating group has again reached its proper final position. Dependent on these two operating circumstances, the stop pistons are adjusted which hinder the movement of the control shaft 13.

The same reversing operation may also be adopted for simple operations for instance for hot blast stoves, system Cowper or the like. The valves would for instance have to be fitted with a controlling disc necessary for the starting-up and stopping of the heating, furthermore for the purging steam valves and finally for the valves of the blowing-hot process.

Various changes may be made in the details disclosed in the foregoing specification without departing from the invention as defined in the claims hereinafter made.

In the claims affixed to this specification no selection of any particular modification of my invention is intended to the exclusion of other modifications thereof.

I claim:

1. In apparatus for automatic sequential control, in combination: a set of hydraulic valve operating pistons; a set of fluid pressure lines for actuating each of the same; hydraulic pilot-piston valves in the respective sets of lines for controlling the actuation of the valve operating pistons; a series of control cams mounted for rotation in unison on a rotatable shaft therefor, for the respective valve operating pistons; a cam follower interposed between each of the pilot valves and their respective cams for actuating the pilot valves; cam stops movable into and out of stopping engagement with the respective cams for arresting and releasing in unison the movement of the cams; an hydraulic stop-operating piston individual to the stops for the individual cams for operating the same; and fluid pressure lines and valve means therefor individual to the respective stop-operating pistons; and means operable by the respective valve operating pistons, in their end positions, for operating the valve means for their respective stop-operating piston to effect reversal of movement of their stops relative to their respective cams.

2. An automatic control apparatus as claimed in claim 1, and in which each of the control cams is provided with two stop-engaging members, in staggered position to one another, within the range of the cam stop which is moved into and out of stopping relationship therewith by means of its hydraulic piston, whereby one stop engaging member prevents the control shaft from being moved during opening of its valve operating piston and the other during the closing movement.

3. An automatic control as claimed in claim 1, and in which an adjustable time-relay hydraulic piston is interposed in the fluid pressure lines between one of said valve means and its respective hydraulic stop-operating piston, for delaying the flow of pressure medium to the latter for an interval to delay withdrawal of its cam stop for an interval after its valve operating piston has been actuated to its open position.

4. An automatic control as claimed in claim 1, and in which a shut-off valve, and an adjustable time-relay hydraulic piston therefor, are interposed in the fluid pressure lines between one of said valve means and its respective hydraulic stop operating piston, for delaying the flow of pressure medium to the latter for an interval to delay withdrawal of its cam stop for an interval after its valve operating piston has been actuated to its open position, said shut-off valve being opened by the time relay piston for flow of pressure medium to the stop-operating piston, and in which the time relay is provided with a rotatable braking gear acting to control the movement of the time relay piston on its active stroke and to return the latter to its initial position on its idle stroke.

JOSEPH DANIELS.